US005663861A

United States Patent [19]

Reddy et al.

[11] Patent Number: 5,663,861

[45] Date of Patent: Sep. 2, 1997

[54] RESETTABLE AUTOMOTIVE CIRCUIT PROTECTION DEVICE

[75] Inventors: Nagi Reddi Kanamatha Reddy, Schaumburg; Robert Swensen, Mount Prospect; Thomas F. Draho, Westchester, all of Ill.

[73] Assignee: Littelfuse, Inc., Des Plaines, Ill.

[21] Appl. No.: 480,124

[22] Filed: Jun. 7, 1995

[51] Int. Cl.[6] .......... H02H 5/04

[52] U.S. Cl. .......... 361/106; 361/103

[58] Field of Search .......... 361/103, 104, 361/106, 111, 118, 119, 124, 126, 127; 337/163, 164; 338/22 R

[56] References Cited

U.S. PATENT DOCUMENTS

| | | | |
|---|---|---|---|
| 4,023,264 | 5/1977 | Schmidt, Jr. et al. | 29/623 |
| 4,164,725 | 8/1979 | Wiebe | 337/198 |
| 4,331,861 | 5/1982 | Meixner | 219/553 |
| 4,635,023 | 1/1987 | Oh | 337/163 |
| 4,698,614 | 10/1987 | Welch et al. | 338/22 R |
| 4,959,505 | 9/1990 | Ott | 338/324 |
| 4,967,176 | 10/1990 | Horsma et al. | 338/22 R |
| 5,142,265 | 8/1992 | Motoyoshi et al. | 338/22 R |
| 5,153,555 | 10/1992 | Enomoto et al. | 338/22 R |
| 5,208,723 | 5/1993 | Jenne | 361/119 |
| 5,233,326 | 8/1993 | Motoyoshi | 338/22 R |

FOREIGN PATENT DOCUMENTS

| | | |
|---|---|---|
| 0 242 902 A2 | 10/1987 | European Pat. Off. . |
| 0 259 179 A2 | 3/1988 | European Pat. Off. . |

*Primary Examiner*—Jeffrey A. Gaffin
*Assistant Examiner*—Ronald W. Leja
*Attorney, Agent, or Firm*—Wallenstein & Wagner, Ltd.

[57] ABSTRACT

A circuit protection device including a pair of terminals to be electrically connected into an electrical circuit, a pair of spaced current-carrying extensions of the terminals, and an initially low resistance current limiting element extending between the current-carrying extensions. The current-limiting element includes flexible conductive current-feeding arms having inner and outer end portions, the inner end portions thereof being electrically connected to the current-carrying extensions of the terminals. The outer end portions of the current-feeding arms are cantilevered and flexible relative to the inner end portions. The device further preferably includes a PTC current-limiting element sandwiched between the flexible outer end portions of the current-feeding arms. The PTC element includes a layer of a PTC material having conductive opposite faces sandwiched between the flexible outer end portions of the arms so that the PTC material carries current between the outer end portions of the current-carrying arms. The layer of PTC material reaches a given trip level at an elevated current, expanding suddenly and substantially to flex the outer end portions of the current-carrying arm.

15 Claims, 4 Drawing Sheets

RESETTABLE AUTOMOTIVE CIRCUIT PROTECTION DEVICE

TECHNICAL FIELD OF THE INVENTION

The present invention is a unique application of variable resistance materials, like positive temperature coefficient (PTC) materials, preferably to automotive circuit protection devices. However, some aspects of the invention have a broader application.

Unlike present automotive fuses which generally have meltable fuse links which require replacement when they are blown, the devices of the present invention have elements, which will occasionally be referred to as fuse links, which have a variable resistance. The resistance changes from a low resistance to a resettable high resistance state when hazardous prolonged overload or short circuit current flows through the fuse link. These devices preferably, but not necessarily, return to their normal low resistance state automatically when the prolonged overload or short circuit condition is abated. In any event, they can be reset so that they are re-useable in the circuits which they are intended to protect.

The expression "fuse link", unless more narrowly defined herein, will mean that portion of a circuit protection device located between the main terminals or conductive extensions of the terminals of the device. That portion includes a body or layer of material which, upon the flow of a potentially hazardous prolonged overload or short circuit current, will present a high resistance to the circuit involved and to the conductive elements which immediately feed current to and from the body or layer.

BACKGROUND OF THE INVENTION

Automotive fuses commonly comprise a synthetic plastic housing containing an all metal piece stamped from a strip of meltable fuse metal to form relatively rigid terminal blades. When the fuse is assembled in an insulating housing, these terminals project in the same plane from the bottom of the housing. Current-carrying extensions of the terminal blades located in the housing are interconnected within the housing by a relatively fragile fuse link which melts and opens the circuit upon hazardous prolonged overload or short circuit conditions. Such a fuse is disclosed in U.S. Pat. No. 4,635,023, granted on Jan. 6, 1987. The preferred form of the present invention utilizes a housing and terminal blade extensions similar to those disclosed in this patent. In such cases, the present fuse has a resettable, rather than a meltable, fuse link extending between the current-carrying extensions of the terminals. In the preferred form of the invention, the resettable fuse link is a positive temperature coefficient (PTC) material.

Resettable circuit protection devices having a PTC fuse link are now available on the market. They are sold in various different configurations, none of which is like those of the present invention. Some of these prior art resettable circuit protection devices include a PTC element having a plate-like appearance and comprising a thin layer of a PTC material having a pair of thin coatings of metal forming terminals or electrodes on the opposite faces of the PTC layer. A pair of thin wire leads are electrically secured by solder to the opposite conductive faces of the PTC layer.

A variety of PTC elements like that just described are referred to as resettable fuses and are sold under the registered trademark Polyswitch® by the Raychem Corporation of Menlo Park, Calif. The maximum continuous, non-hazardous current of these Polyswitch® fuses that will not cause the PTC element at 20° C. to switch from its low to its high resistance state, referred to as the "holding current," presently spans the current range of about 0.9–9.0 amps. The range of trip currents, which is the minimum continuous current that will cause the Polyswitch® fuses to be switched or tripped to a high resistance circuit-protecting state at 20° C., varies from about 1.8 to 18 amps. This high resistance circuit-protecting state is maintained by a small self-heating current. The largest fault current which such devices can interrupt without being damaged varies from about 50–100 amps. The initial minimum resistance of these circuit protection devices varies from about 0.02 to 0.20 ohms.

The PTC materials believed to be used in these Polyswitch® fuses are disclosed in U.S. Pat. Nos. 4,237,441, and 4,545,926. These types of PTC materials include a mixture of organic crystalline polymers in which are distributed conductive particles which may include carbon black. With such materials, as current flow therethrough progressively increases they are progressively heated until the current reaches the trip current level. At this level, the resistance suddenly increases to a substantially higher level due to the fact that the material suddenly expands. This expansion separates the conductive particles by larger distances, providing a greatly increased resistance through the particles.

The configurations in which these PTC resettable fuse devices have been commercially available are not suitable for automotive fuse applications.

SUMMARY OF THE INVENTION

The preferred forms of the present invention utilize plate-like PTC elements, such as those disclosed in pending application Ser. No. 08/437966, filed on May 10, 1995, and also in U.S. Pat. Nos. 4,237,441, 4,545,926, 4,689,475 and 4,800,253. These elements may be used singly, or for the highest current ratings, in a uniquely arranged sandwich of such elements, mounted between flexible current-feeding arms. These arms are conductively connected to the extensions of coplanar plug-in terminal blades like that shown in U.S. Pat. No. 4,635,023. The flexible arms and the one or more PTC elements mounted between the flexible arms are sometimes referred to as the fuse link of the claimed circuit protection device.

In the preferred single PTC element embodiment of the invention, the flexible current-feeding arms are cantilevered and project in opposite directions from the spaced confronting margins of the current-carrying extensions of the terminal blades. To aid in the low cost, mass production of the circuit protection devices of the invention, both the terminal blades and their current-carrying extensions thereof, and the cantilevered, flexible, current-feeding arms, are preferably initially stamped from the same sheet of metal. In such case, the ends of the stamped current-feeding arms are initially coplanar, but spaced apart. The arms are then flexed to permit the insertion therebetween of the plate-like PTC element, with the opposite conductive faces of the PTC element resiliently sandwiched between the flexed, current-feeding arms. To assure a desired flexibility of the current-feeding arms, the arms can be stamped from a skived or thinned portion of sheet metal. The plug-in terminal blades and their current-carrying extensions are stamped from the thicker portions of the sheet metal, so that they form rigid plug-in portions of the device.

In a less preferred form of the invention, the current-feeding arms can be separate flexible wires or the like, which are soldered or welded to the current-carrying extensions of the terminal blades. In this form of the invention, the ends of these current-carrying wires may be in different planes but confront in overlapped relation.

In both forms of the devices just described, if the layer of PTC material of the PTC element is of the type which must expand when it is heated by the trip current, the flexibility of the current-feeding arms is necessary to permit that expansion so that the conductive particles dispersed thereon can be further separated to provide the desired high resistance condition of the element in its tripped condition.

As previously indicated, another unique feature of the invention utilizes a sandwich or stack of a number of plate-like PTC elements, like those disclosed in pending application Ser. No. 08/437966, filed on May 10, 1995, and also in U.S. Pat. Nos. 4,237,441, 4,545,926, 4,689,475 and 4,800,253. These PTC elements are electrically connected in parallel. This multiplies the current rating of the device by the number of elements so connected. Where there is a stack of three such PTC elements, one of the conductive faces of the central element and the inner conductive face of one of the outer elements are connected together and to the outer conductive face of the other outer element. The other conductive face of the central element and the inner conductive face of the latter element are connected together and to the outer conductive face of the first mentioned outer element. All these elements are identically oriented so that the conductive faces of the plate-like PTC elements are in parallel planes, thus, expansion of the elements under increased current flow is in the same direction. The outer conductive faces of the outermost elements are then sandwiched between flexible current-carrying arms. This forms a package of three PTC elements connected in parallel.

In accordance with another feature of this parallel embodiment of the invention, heat sinks, which may be copper plates, are respectively located between each of the inner conductive faces of the outer PTC elements and the adjacent conductive faces of the central element. They also form conductive paths which connect the PTC elements in parallel.

An essential discovery of the inventors is that the PTC elements must be allowed to expand for this invention to be effective. Such expansion is permitted.

The above and other features of the invention will become apparent by reference to the specification, claims, and drawings.

DETAILED DESCRIPTION OF THE INVENTION

Figure 1:
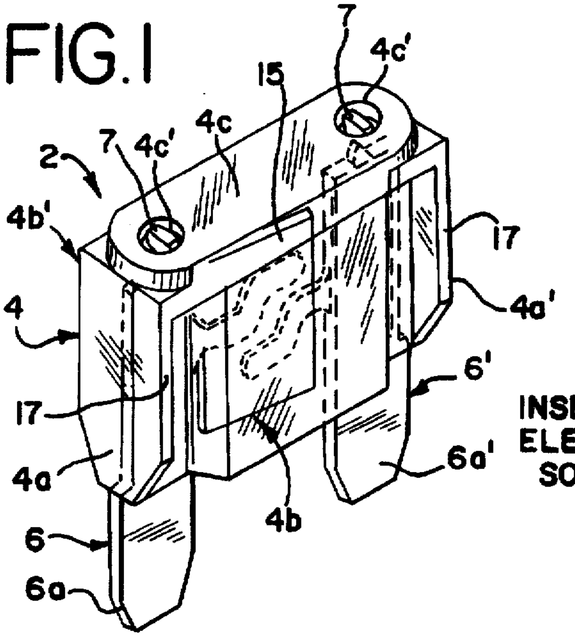
FIG. 1 is a perspective view of a preferred resettable automotive circuit protection device of the invention with confronting plug-in terminals, and using one PTC element.

Exemplary Form of the Invention Shown in FIGS. 1–5

FIGS. 1–5 show the most preferred form of the circuit protection device 2 of the present invention, using a single PTC element 10. The device 2 is made initially of only three separate parts. These are an open bottom insulating housing 4, the PTC element 10 and a pair of sheet metal pieces 6–6' respectively forming a pair of spaced, parallel, rigid, confronting, coplanar terminal blades *6a–6a'* and current-carrying extensions *6b–6b'*. Projecting from the confronting margins of the current-carrying extensions are thinner, flexible cantilever current-feeding arms *6c–6c'*. The terminal blades *6a–6a'*, current-carrying extensions *6b–6b'* thereof, and the cantilevered arms *6c–6c'* were originally portions of a single strip 12 of sheet metal shown in FIG. 5. The strip unwinding from a roll (not shown) is moved to a series of processing stations. This includes metal stamping stations S1–S2, a station S3 at which the PTC element 10 is inserted between the confronting faces of the cantilevered arms *6c–6c'* and is soldered thereto, and a station S4 which inserts the open-bottom housing 4 over the end of the strip before the end portion of the strip is severed to form an almost completely finished device 2. To increase the flexibility of the arms *6c–6c'*, the strip 12 is skived in the center thereof, to provide a thin region 12" between shoulders 12'—12' from which region the arms *6c–6c'* are stamped. Since the arms *6c–6c'* are fragile and spaced apart, the integrity of the strip is maintained by webs 11 of material extending between the terminal blades *6a–6a'* of the various segments of the strip. Each web 11 is subsequently severed from the terminal blades 6a–6a'.

The PTC element 10 may be a thin plate-like element which comprises a central layer 10b (FIG. 4) on the opposite flat faces of which are applied thin layers or coatings of metal 10a–10a', forming electrodes for the PTC element 10. Preferably, the PTC elements and methods for manufacturing them disclosed in pending application Ser. No. 08/437966, filed on May 10, 1995 are to be used in the present invention.

Specifically, central layer 10b may comprise 65% by volume high density polyethylene (manufactured by Quantum under the trade name Petrothene) and 35% by volume carbon black (manufactured by Cabot under the trade name BP 160-Beads). The composition which comprises central layer 10b may be produced by placing the high density polyethylene in a C.W. Brabender Plasti-Corder PL 2000 equipped with a Mixer-Measuring Head and fluxing it at 200° C. for approximately 5 minutes at 5 rpm. At this point the polyethylene is in a molten form. The carbon black is then slowly dispersed into the molten polyethylene over a 5 minute period at 200° C. at 5 rpm. The speed of the Brabender mixer is then increased to 80 rpm, and the polyethylene and carbon black are thoroughly mixed at 200° C. for 5 minutes. The energy input, due to the mixing, will cause the temperature of the composition to increase to 240° C.

After allowing the composition to cool, the composition is then placed into a C.W. Brabender Granu-Grinder where it is ground into small chips. The chips are then fed into the C.W. Brabender Plasti-Corder PL 2000 equipped with an Extruder Measuring Head. The extruder is fitted with a die having an opening of 0.002 inch, and the belt speed of the extruder is set at 2. The temperature of the extruder is set at 200° C., while the screw speed of the extruder is set for 50 rpm. The chips are extruded into a sheet approximately 2.0 inches wide by 8.0 feet long. This sheet is then cut into a number of smaller sample PTC sheets (preferably 2.0 inch× 2.0 inch), and pre-pressed at 200° C. to a thickness of approximately 0.01 inch.

A polymer based thick film ink (CB115, manufactured by DuPont Electronic Materials) can then be applied to the top and bottom surfaces of the sample PTC sheets. The thin layers or coatings of metal which form electrodes 10a–10a' can include the silver-plated copper wire cloth (No. 9224T39, distributed by McMaster-Carr) disclosed in Example 1 in pending application Ser. No. 08/437966, filed on May 10, 1995, or the nickel foam (available from Inco Specialty Powder Products) disclosed in Example 2 in pending application Ser. No. 08/437966, filed on May 10, 1995. The electrode material is affixed to the top and bottom thick film ink coated surfaces of the sample PTC sheets.

If the metal electrodes 10a–10a' comprise the silver-plated copper wire cloth material, the sandwich structure (i.e., metal electrode 10a, central layer 10b, metal electrode 10a') is placed in a hot press for approximately four minutes at 400 p.s.i. and 230° C.

If the metal electrodes 10a–10a' comprise the nickel foam material, the sandwich structure (i.e., metal electrode 10a, central layer 10b, metal electrode 10a') is placed in a hot press having plates set at a temperature of 235° C. The temperature of the laminate is monitored until it reaches 220° C., at which point a pressure of 300 p.s.i. is applied to the laminate for 1 minute. The pressure in the press is then relieved. The laminate is then exposed to 625 p.s.i. for 5 minutes, while maintaining the plates of the press at 235° C.

In either embodiment, the laminated sheet is removed from the press and allowed to cool without further pressure. The laminated sheet is then sheared or punched into a plurality of PTC elements 10. The size of PTC element 10 will vary with the desired rating of the element. U.S. Pat. Nos. 4,545,926, 4,689,475, 4,237,441, and 4,800,253 also disclose PTC elements and methods for manufacturing PTC elements which may be used in the present invention.

When the PTC element 10 comprises a PTC layer 10b where the material includes a crystalline polymer in which is dispersed conductive particles, it is especially important that the cantilevered arms 6c–6c' be flexible relative to the relatively rigid, thicker portions of the terminal blades 6a–6a' and current-carrying extensions 6b–6b' thereof with which the arms are associated. When the temperature of the PTC layer 10b is raised to the trip point where the polymer material suddenly expands, the flexibility of the cantilevered arms 6c–6c' permits this expansion.

The housing 4 is preferably constructed as illustrated, where it has a pair of spaced confronting vertical side walls 4b–4b', a pair of vertical end walls 4a–4a' extending between the outer vertical margins of the side walls 4b–4b', and a top wall 4c having a pair of test probe-receiving holes 4c—4c' (FIG. 1). The housing side walls 4b–4b' have relatively widely spaced central portions 4b-1 and 4b-1' (FIG. 3) which form a fairly substantial clearance space 19 within which the cantilevered arms 6c–6c' and the PTC element 10 are located. The size of the space 19 is such that the current-carrying arms 6c–6c' will be substantially spaced from these walls over the temperature range to which the PTC layer 10b of the PTC element is exposed. The outer margins of the side wall portions 4b-1 and 4b-1' merge with recessed wall portions 4b-2 and 4b-2' (FIG. 3) which are closely spaced to form interior narrow mounting slots or grooves 21–21' within which the current-carrying extensions 6b–6b' are closely confined. The upper ends of the current-carrying extensions 6b–6b' terminate in mounting tabs 7–7' which initially pass through narrow slots 9–9' formed in the top wall 4c of the housing at the bottom of the top wall test probes receiving holes 4c'—4c'. The tabs 7–7' are then twisted to anchor the terminal blade extensions 6b–6b' in place in the housing 4.

The end walls 4a–4a' of the housing 4 extend into inwardly offset grooves 13–13' so that the outer margins of the housing end walls 4a–4a' are aligned with the outer margins of the terminal blades 6a–6a'. Also, the side and upper margins of each housing side wall 4b and 4b' at 15 and 17—17 are in a common vertical plane so that the devices 2 can be stably stacked side-by-side when fed from magazines into sockets in fuse blocks by automatic fuse mounting devices. The housing end walls 4a–4a' are in vertical planes for the same reason, namely, so that they can be stacked stably in end-to-end relation in magazines for automatic feeding into fuse block sockets.

The terminal blades 6a–6a' are plugged into sockets (not shown) to connect the PTC element 10 in series with a load resistance. This load resistance is 10 or more times greater than the resistance of the circuit protector device. When a normal current flows through that device, a modest amount of heat is generated in the PTC element layer 10b as a result of this low resistance. However, if the load resistance should be short circuited or become substantially reduced so that an undesired prolonged overload current flows through the PTC element 10, the current will reach a level known as the trip current of the PTC element 10. At this trip current level, the resistance of the PTC element 10 will suddenly increase by a large factor. The resulting higher resistance of the PTC element 10 now limits flow of current to a safe value. This limited current generated is nevertheless sufficient to keep the PTC layer 10b in a high resistance condition. If the load resistance should return a normal low value, either by replacement of the load itself or by removal of the condition which caused the high load, the current then flowing in the device 2 will be reduced below the trip level and the fuse is automatically reset to its original low resistance condition.

Figure 6:
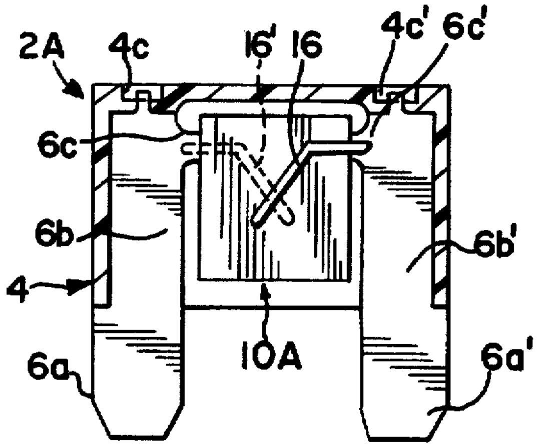
FIG. 6 is a vertical sectional view through a less preferred, single PTC-element automotive circuit protection device of the invention, with confronting plug-in terminals.
Figure 7:
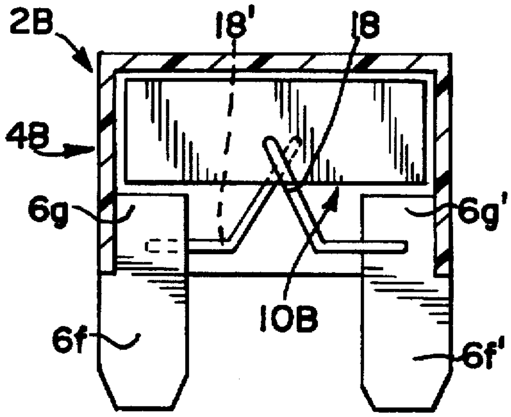
FIG. 7 is a vertical sectional view through a modified single PTC element automotive circuit protection device of the invention with confronting plug-in terminals.

Embodiments of FIGS. 6 and 7

FIGS. 6 and 7 show less preferred forms of the invention, which require an additional two separate pieces to form the assembled circuit protection device. The embodiment of FIG. 2 included cantilevered arms 6c–6c' which were formed as an integral part of the terminal blades 6a–6a' and terminal blade extensions 6b–6b'. In contrast, in the embodiments illustrated in FIGS. 6 and 7, cantilevered current-feeding arms are formed by separate conductive wire-like elements (a) 16–16' in the circuit protection device 2A of FIG. 6; and (b) 18–18' in the circuit protection device 2B of FIG. 7. The inner ends of these wire-like elements are soldered or otherwise connected to terminal tabs 6c–6c' projecting from the terminal blade extensions 6d–6d' of the device 2A in FIG. 6 and are soldered or otherwise connected to terminal blade extensions 6g–6g' of device 2B in FIG. 7. The other ends of these wire-like elements 16–16' and 18–18' are respectively soldered to the opposite conductive faces of the PTC element 10A of the device 2A in FIG. 6 and the PTC element 10B of the device 2B in FIG. 7.

The devices 2A and 2B also differ in that the device 2A has the identical housing 4 used by the device 2 shown in FIGS. 1–4. Such a housing 4 of device 2A includes test probe-receiving openings 4c–4c' in which are exposed the twisted upper ends of the terminal blade extensions 6b–6b' of terminal blades 6a–6a'.

The housing 4B of device 2B of FIG. 7, however, does not have any test probe-receiving openings. Accordingly, its terminal blades 6f–6f' terminate in very short current-carrying extensions 6g–6g' leaving a much wider space above the terminal blade extensions for a horizontally elongated PTC element 10B, which extends almost the full width of the interior of the housing 4B.

In contrast, the PTC element 10A in the circuit protection device 2A shown in FIG. 6 is a vertically elongated element which fits within the space between the confronting margins of the terminal blade extensions 6b–6b'.

Figure 8:
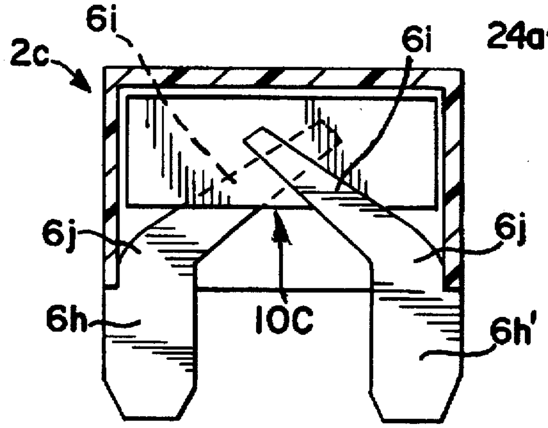
FIG. 8 is a vertical sectional view through a still further modified single PTC element automotive circuit protection device of the invention with confronting plug-in terminals.

Embodiment of FIG. 8

FIG. 8 illustrates a modification of a circuit protection device wherein a pair of cantilevered arms 6i–6i' project and incline inwardly and upwardly from terminal blade extensions 6j–6j'. One sheet metal stamping is used to form an arm 6i or 6i', a terminal blade extension 6j or 6j', and a terminal blade 6h or 6h'. However, it should be noted that the distal ends of the cantilevered arms 6i–6i' are in spaced-apart, overlapping relation. Thus, both terminal blades and their current-carrying extensions in association with the cantilevered arms are made from separate stampings. The distal ends of the cantilever arms 6i–6i' are shown soldered and connected to the opposite conductive faces of a horizontally elongated PTC element 10C, which may be the same element 10B shown in the embodiment of FIG. 7. The circuit protection device 2C of FIG. 8 also is devoid of any test probe-receiving apertures, as in the previously described embodiments of FIG. 7.

Figure 11:
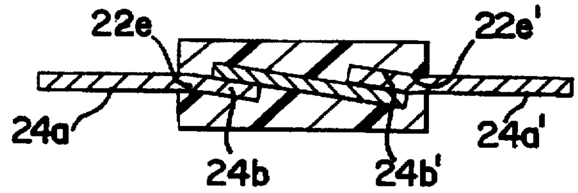
FIG. 11 is a horizontal sectional view through FIG. 9 taken along section line 11—11 of FIG. 9.
Figure 9:
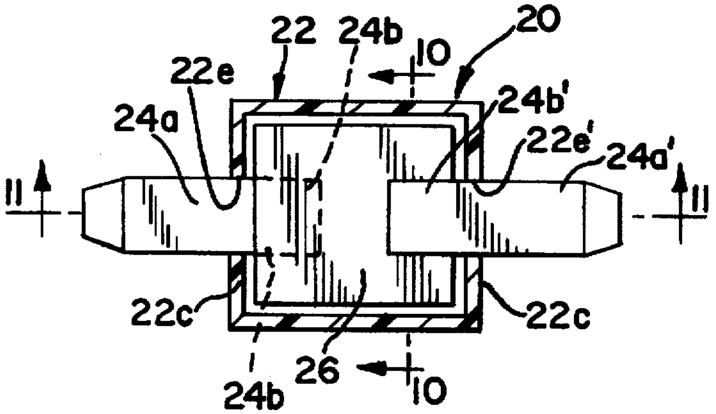
FIG. 9 is a vertical sectional view through another modified, single PTC element automotive circuit protection device of the invention, but where the plug-in terminals extend longitudinally from opposite sides of the housing.
Figure 10:
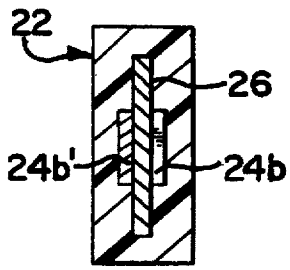
FIG. 10 is a vertical transverse sectional view through FIG. 9, taken along section line 10—10 of FIG. 9.
Figure 13:
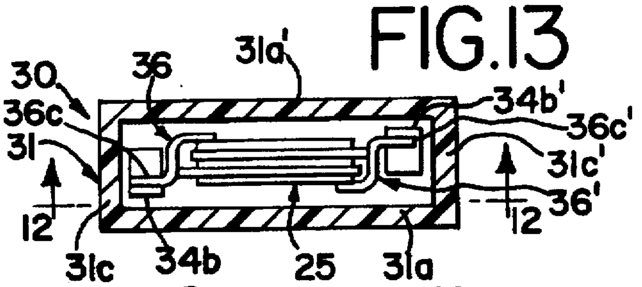
FIG. 13 is a horizontal sectional view through FIG. 12, taken along section line 13—13.
Figure 12:
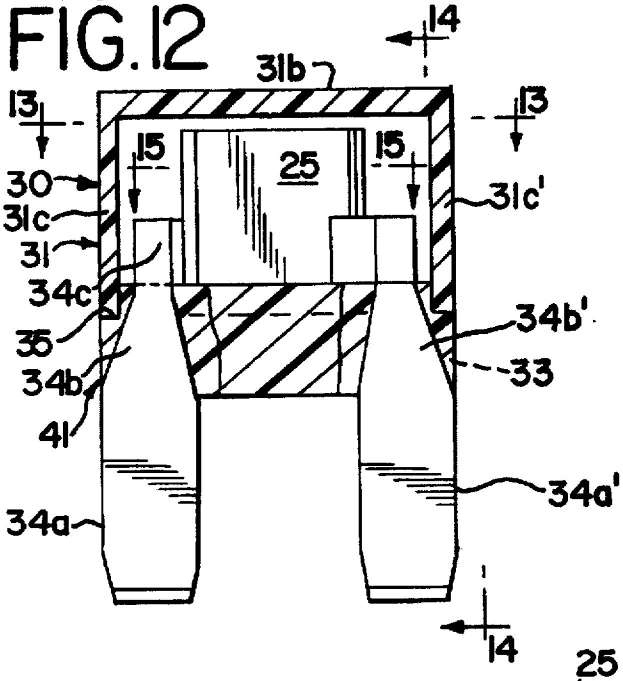
FIG. 12 is a vertical sectional view of a three PTC-element automotive circuit protection device of the invention, taken along section line 12—12 in FIG. 13.
Figure 14:
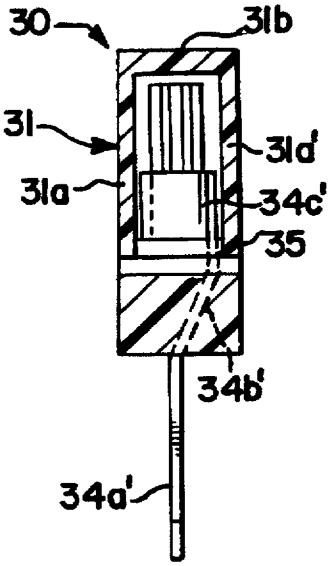
FIG. 14 is a vertical sectional view through FIG. 12, taken along section line 14—14 of FIG. 12.
Figure 15:
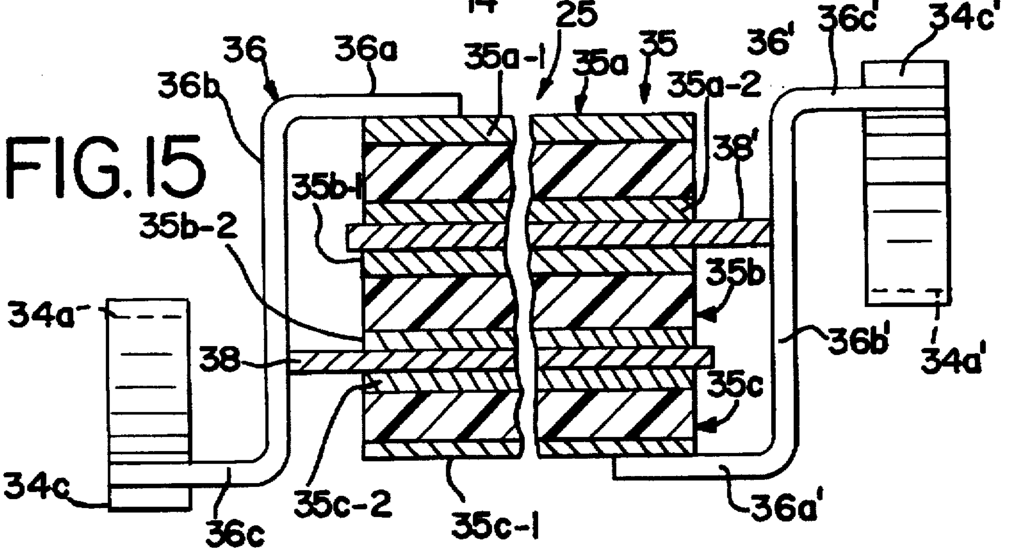
FIG. 15 is an enlarged horizontal sectional view through the metal portions of the circuit protection device shown in FIG. 12, taken along section line 15—15 of FIG. 12 and before the metal portions been encapsulated in an insulating base.

Embodiment of FIGS. 9–11

The circuit protection device 20 shown in FIGS. 9–11 is one wherein the terminal blades 24a–24a' project in opposite directions through apertures 22e–22e' in the opposite end walls 22c–22c' of a rectangular housing 22. The openings 22e–22e' are centered in the opposite end walls 22c–22c' of the housing 22. Accordingly, the current-carrying extensions 24b–24b' of the terminal blades 24a–24a' within housing 22 are bent into offset planes, so that they can be soldered to the opposite parallel conductive faces of a square PTC element 26.

Embodiment of FIGS. 12–16

The embodiment of the circuit protection device 30 shown in FIGS. 12–16 includes a sandwich 25 of three PTC elements 35a, 35b and 35c to greatly increase the current-carrying capacity of the devices previously described. The conductive faces of these PTC elements are confronting and parallel to each other, so that their expansion upon increases in temperature is cumulative. The device 30 shown in these figures is packaged in a manner similar to that shown in the embodiments of FIGS. 1–8, in that the terminal blades 34a–34a' thereof project in spaced confronting and coplanar relationship through the open bottom of a housing 31 which resembles the housing used in the embodiment of the invention shown in FIG. 8. The terminal blades 34a–34a' join current-carrying extensions 34b–34b', the base portions of which angle in opposite directions and terminate in spaced, vertical terminal tabs 34c–34c' which are soldered or otherwise connected to the outer faces of terminal tab attaching arms 36c–36c' of a pair of metal Z-shaped PTC element-mounting brackets 36–36'. The terminal tab attaching arms 36c–36c' of these brackets extend in spaced, parallel planes and respectively join the mid-sections 36b–36b' of the brackets 36–36' extending at right angles thereto. The mid-sections 36b–36b' of the Z-shaped brackets 36–36' terminate in the PTC element-attaching arms 36a–36a' which are respectively soldered or otherwise electrically connected to the outer conductive faces or terminals 35a-1–35c-1 of the outer PTC elements 35a–35c. The PTC element attaching arms 36a–36a' act as flexible arms cantilevered from the mid-section 36b–36b' of the brackets 36a–36a'. The expansion of the PTC layer of the sandwich of PTC elements 35 will thus flex the arms 36–36'. Positioned between the outer PTC elements 35a–35c is a central PTC element 35b. The conductive faces or terminals 35b-1 and 35b-2 of the central PTC element 35b are respectively connected to the innermost conductive faces 35a-2 and 35c-2, respectively of the outer PTC elements 35a and 35c by copper heat sink plates 38 and 38' which respectively extend to and make electrical contact with the mid-section 36b–36b' of the brackets 36–36'. The PTC elements are thus effectively connected in parallel with each other.

The sandwich 25 of PTC elements 35a–35c and the Z-shaped brackets 36–36' are located in spaced relationship to a pair of main vertical spaced side walls 31a–31a' of an insulating housing 31 open at the bottom thereof. The top of the vertical side walls 31a–31a' join a horizontal top wall 31b and the side margins thereof join a pair of end walls 31c–31c'. The bottom of the housing end and side walls rest on and are secured to a ledge extending over the margins of a rectangular insulating base 41 made of a material molded around the tapered bottom portions of the extensions 34b–34b' of the terminal blades 34a–34a'.

Figure 2:
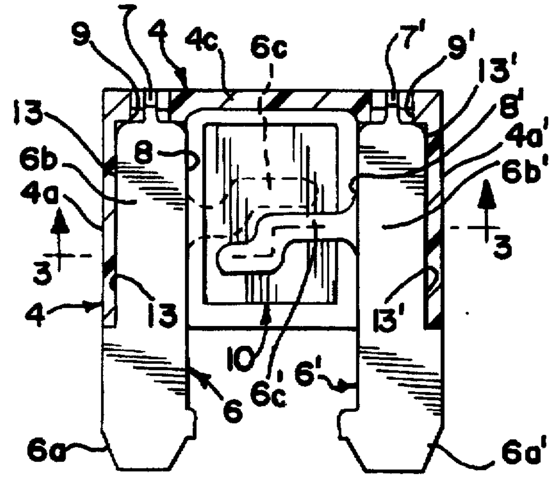
FIG. 2 is a vertical sectional view through the device of FIG. 3.
Figure 3:
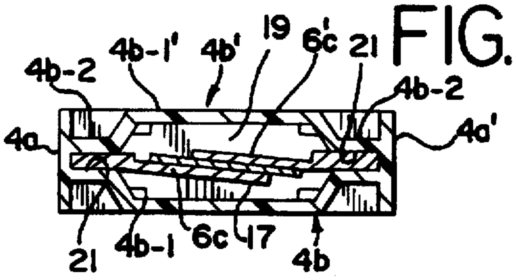
FIG. 3 is a horizontal sectional view through FIG. 2, taken along section line 3—3.
Figure 4:
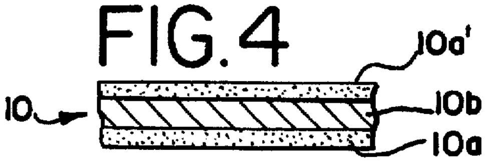
FIG. 4 is a fragmentary and greatly magnified sectional view through the plate-like PTC element of FIG. 3.
Figure 5:
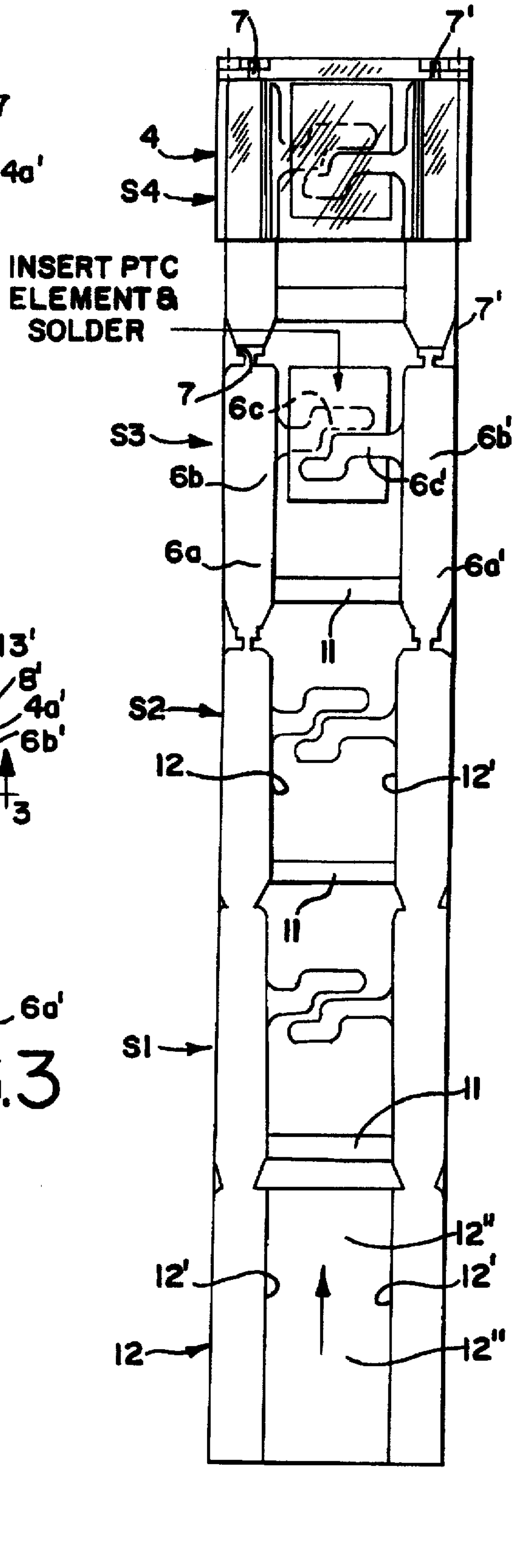
FIG. 5 illustrates the different steps in the manufacture of the fuse shown in FIG. 2.

Assuming that the PTC elements 35a, 35b or 35c are each identical to the PTC element 10 shown in FIG. 2, the current rating of the circuit protection device 30 shown in FIGS. 12–15 is three times that of the circuit protection device shown in FIG. 2. This is because the load current will split evenly between the three PTC elements 35a, 35b and 35c.

One exemplary specification for the PTC element sandwich is as follows:

PTC Elements 35a, 35b and 35c—Disclosed in U.S. Pat. No. 4,800,253

Dimensions of each PTC Element: Thickness=0.0115"

Length×Height=0.560"×0.500"

Copper Heat Sink Dimensions: Thickness=0.022 Length×Height=0.630×0.500

Figure 16:
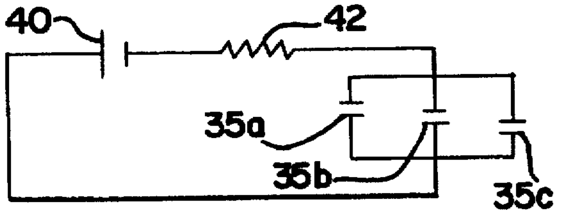
FIG. 16 is an automotive circuit in which the device of FIGS. 12–15 is inserted.

FIG. 16 shows the PTC elements 35a, 35b and 35c connected in parallel with each other and in series with a car battery 40 and an electrical device or devices 42, illustrated diagrammatically as a load resistance. This device which operates in the same manner as that of FIGS. 1–5, except that the load current splits evenly into three paths.

Embodiments of FIGS. 17–20

Figure 17:
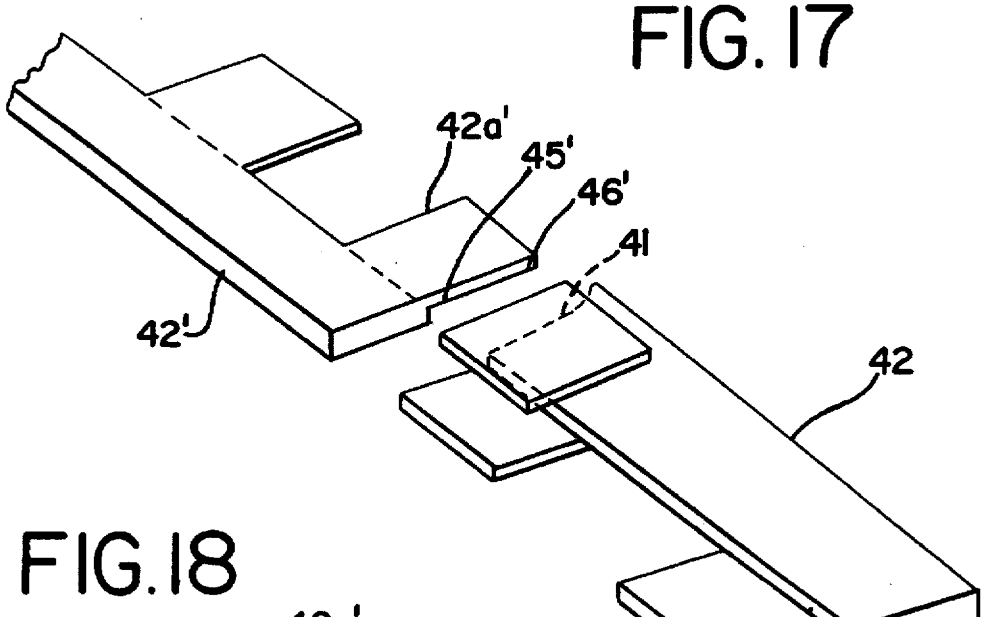
FIG. 17 is an exploded perspective fragmentary view of another embodiment of the automotive circuit protection devices of the present invention prior to their final assembly.
Figure 18:
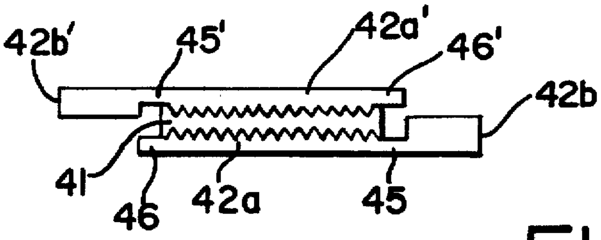
FIG. 18 is a horizontal sectional view of a single automotive circuit protection device illustrated in FIG. 17, taken along section line 18—18.
Figure 19:
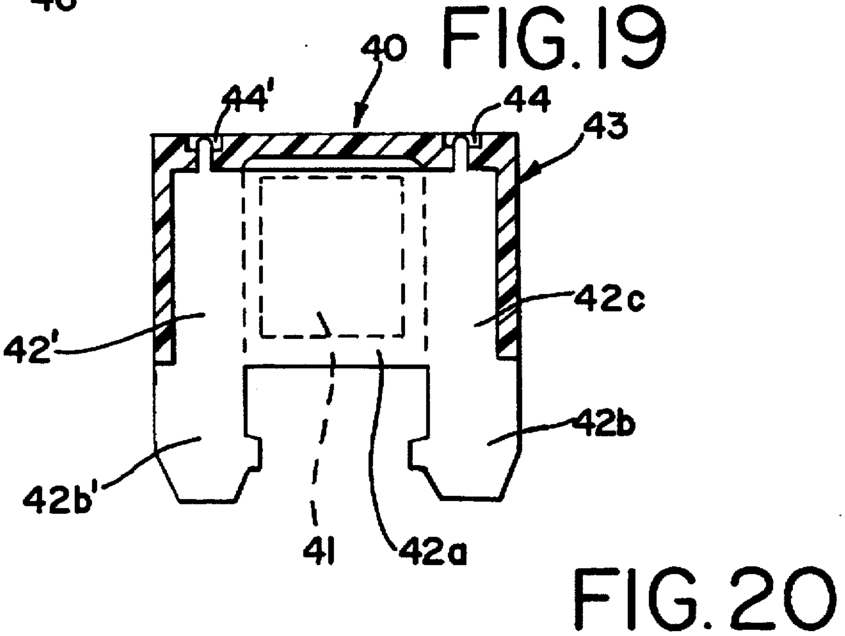
FIG. 19 is a vertical sectional view of a single automotive protection device illustrated in FIG. 18; and, FIG. 20 is an exploded fragmentary view of the interface between the plate-like PTC element and the electrode of the single automotive circuit protection device illustrated in FIG. 18.

The embodiment of the circuit protection device 40 illustrated in FIGS. 17–19 includes a single PTC element 41, and a pair of sheet metal pieces 42–42' (originally one piece) respectively forming a pair of spaced, parallel, rigid, confronting, coplanar terminal blades 42b–42b' and current-carrying extensions 42c–42c'. Projecting from the current-carrying extensions are skived, i.e., thinner, flexible cantilever electrodes 42a–42a'. The skived electrode portions 42a–42a', terminal blades 42b–42b', and current-carrying extensions 42c–42c' are formed from a continuous single strip of sheet metal.

As illustrated in FIGS. 17–19 skived electrodes 42a–42a' have inner end portions 45–45' and outer end portions 46–46'. The inner end portions 45–45' are electrically connected to the current carrying extensions 42c–42c" of the terminal blades 42b–42b'. The outer end portions 46–46' of skived electrodes 42a–42a' are cantilevered and flexible with respect to the inner end portions 45–45'.

Figure 20:
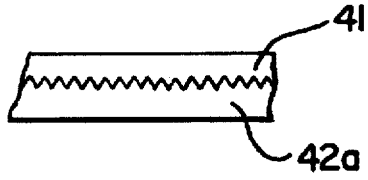

Referring specifically to FIGS. 18 and 20, PTC element 41 is similar to PTC element 10 in FIGS. 1–5, except that PTC element 41 does not include thin layers or coatings of metal 10a–10a'. Instead, PTC element 41 comprises a single plate-like element, preferably a polymer made conductive by dispersing conductive particles therein, as discussed in detail above. The inner surface of skived electrode portions 42a–42a' are micro-grooved to increase surface area and improve the electrical connection between PTC element 41 and skived electrode portions 42a–42a'.

PTC element 41 is sandwiched between and ultrasonically bonded to the outer end portions 46–46' of the flexible skived electrodes 42a–42a' so as to be in electrical contact with the outer end portions 46–46'. PTC element 41 conducts a given range of electrical currents presenting a relatively low resistance, however, when current flow therethrough reaches a given trip level the resistance thereof suddenly increases to a relatively high resistance value to limit current in the circuit it is being used to protect.

With reference now to FIG. 19, the sandwich structure illustrated in FIG. 18 has the identical housing 43 used by the device 2 shown in FIGS. 1–4. Such a housing 43 of device 40 includes test probe receiving openings 44–44' in which are exposed the upper ends of the terminal blade extensions 42b–42b'.

Interpretation of the Claims

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances, even the specific claims involved should be construed in light of the doctrine of equivalents.

We claim:

1. A circuit protection device to be connected into a circuit presenting a given load resistance, said circuit protection device including a pair of terminals to be electrically connected into said circuit, a pair of current-carrying extensions of said terminals, and an initially low resistance current-limiting means extending between said current-carrying extensions, the improvement wherein said current-limiting means comprises:

a pair of current-feeding arms having inner and outer end portions, said inner end portions thereof being electrically connected respectively to said current-carrying extensions of said terminals, said outer end portions of said current-feeding arms being cantilevered and flexible with respect to said inner end portions thereof; and a current-limiting PTC element composed of a PTC material having conductive opposite faces sandwiched between said outer end portions of said current-feeding arms so that said PTC material carries current between said outer end portions of said current-feeding arms, said PTC material conducting a given range of currents at a given relatively low resistance value, and when current flow therethrough reaches a given trip level, said PTC material will expand to flex said current-feeding arms, permitting said PTC material to have a relatively high resistance value to limit current in said circuit.

2. A circuit protection device to be connected into a circuit presenting a given load resistance, said device including a pair of conductive terminals to be electrically connected in said circuit; a pair of current-carrying extensions of said terminals and an initially low resistance current-limiting means extending between said current-carrying extensions; the improvement wherein said current-limiting means comprises:

a pair of flexible, conductive current-feeding arms projecting in opposite directions from said current-carrying extensions; and a current-limiting PTC element composed of a crystalline polymer having carbon black dispersed therein, said current-limiting PTC element being sandwiched and electrically connected between said current-feeding arms so that said current-limiting PTC element receives current flowing in said current-feeding arms and said current-carrying extensions, and when a normal current passes through said current-limiting PTC element, the element has a relatively low resistance and, when a higher trip current which is to be limited by the device flows through the element, said PTC element expands, causing said current-feeding arms to flex and the resistance of said PTC element to increase to a relatively high resistance to limit current flow in the circuit in which the device is placed.

3. The circuit protection device of claim 1 or 2 wherein said PTC element has a plate-like configuration with opposite flat conductive faces along which said current-feeding arms extend.

4. The circuit protection device of claim 1 or 2 wherein each of said current-feeding arms and the associated terminal and current-carrying extension thereof are cut from a single piece of metal.

5. The circuit protection device of claim 1 or 2 wherein said pair of current-feeding arms and the associated terminals and current-carrying extensions thereof are cut from a single piece of metal.

6. The circuit protection device of claim 4 wherein said terminals and current-carrying extensions thereof are cut from a relatively thick portion of said single piece of metal and said current-feeding arms are cut from a relatively thin portion of said single piece of metal.

7. The circuit protection device of claim 1 or 2 wherein there is provided at least two of said current-limiting PTC elements connected in parallel between said current-feeding arms to form an overall assembly with a normal current rating greater than one of said current-limiting PTC elements.

8. The circuit protection device of claim 1 or 2 combined with an insulating housing from which said terminals extend and which encloses said current-carrying extensions and current-limiting means.

9. In a plug-in circuit protection device comprising an insulating housing and a conductive plug-in body having conductive terminals to be electrically connected in an electrical circuit and projecting from said housing, current-carrying extensions of said terminals in said housing and current-limiting means extending between said current-carrying extensions in said insulating housing; and said insulating housing and conductive plug-in body having interconnections securing said conductive plug-in body within said insulating housing, the improvement wherein said current-limiting means comprises:

flexible current-feeding arms cantilevered and projecting in opposite directions from said current-carrying extensions;

and a body comprising a PTC material having opposite conductive faces for directing current through said PTC material and sandwiched and connected between said current-feeding arms so that said PTC material carries current flowing between said terminals, and when a normal current passes between said terminals, said PTC material has a relatively low resistance, and when heated by the passage of a higher trip current passing therethrough, said PTC material will suddenly expand to flex said current-feeding arms, permitting said material to have a relatively high resistance to limit current flow.

10. The device of claim 9 wherein said current-feeding arms are spaced from side walls of said insulating housing a sufficient distance that they will not contact said side walls of said insulating housing during said expansion.

11. A circuit protection device to be connected into a circuit presenting a given load resistance, said device including a pair of terminals to be electrically connected into said circuit, a pair of current-carrying extensions of said terminals, and an initially low resistance current-limiting means extending between said current-carrying extensions, the improvement wherein said current-limiting means comprises:

a plurality of PTC elements having two outermost PTC elements configured between a pair of flexible and cantilevered current-feeding arms having inner and outer end portions, the inner end portion of said current-feeding arms respectively being electrically connected to said pair of current-carrying extensions and the outer end portion of said current-feeding arms respectively being connected to said outermost PTC elements; and at least two of said PTC elements being electrically connected in parallel to one another, each of said PTC elements being composed of a crystalline polymer having carbon black dispersed therein so that when current flow through said PTC elements reaches a given trip level, said PTC elements expand and flex said current-feeding arms.

12. The circuit protection device of claim 11 wherein there is located, between said plurality of PTC elements, a heat sink-forming body in both electrical and heat conducting relationship with one of said current-feeding arms.

13. The circuit protection device of claim 11 or 12 wherein each said current-feeding arm forms a substantially Z-shaped member in a single plane, each of said member including an intermediate section and outer sections extending in opposite directions at opposite ends of said intermediate section, one of said outer sections of each of said Z-shaped member extending along and electrically connected to one of said outermost PTC elements and one of said outer sections of said other Z-shaped member extending along and electrically connected to the said other outermost PTC element.

14. A circuit protection device to be connected into an electrical circuit presenting a given load resistance, said circuit protection device including a pair of terminals to be electrically connected into said electrical circuit, a pair of flexible skived electrodes, and an initially low resistance current-limiting means extending between said flexible skived electrodes, said terminals including a pair of current-carrying extensions, the improvement wherein said current-limiting means comprises:

said flexible skived electrodes having inner and outer end portions, said inner end portions thereof being electrically connected respectively to said current-carrying extensions of said terminals, said outer end portions of said flexible skived electrodes being cantilevered and flexible with respect to said inner end portions thereof; and a PTC element sandwiched between and in electrical contact with said outer end portions of said flexible skived electrodes, so that said PTC element carries ,current between the outer end portions of said flexible skived electrodes, said PTC element conducting a given range of currents presenting a given relatively low resistance value, and when current flow therethrough reaches a given trip level, the PTC element expands, causing said skived electrodes to flex and the resistance of said PTC element to increase to a relatively high resistance value to limit current in said electrical circuit.

15. The circuit protection device of claim 14, wherein said flexible skived electrodes have a micro-grooved inner surface.

* * * * *

UNITED STATES PATENT AND TRADEMARK OFFICE

CERTIFICATE OF CORRECTION

PATENT NO. : 5,663,861

DATED : September 2, 1997

INVENTOR(S) : Nagi Reddi, et. al.

It is certified that error appears in the above-identified patent and that said Letters Patent is hereby corrected as shown below:

Column 12, line 50, ",current" should be -- current--.

Signed and Sealed this

Seventh Day of April, 1998

Attest:

BRUCE LEHMAN

*Attesting Officer*

*Commissioner of Patents and Trademarks*